US007593344B2

(12) United States Patent
Jordan et al.

(10) Patent No.: US 7,593,344 B2
(45) Date of Patent: Sep. 22, 2009

(54) SYSTEM AND METHOD FOR REPROGRAMMING NODES IN AN AUTOMOTIVE SWITCH FABRIC NETWORK

(75) Inventors: Patrick D. Jordan, Austin, TX (US); Hai Dong, Austin, TX (US); Hugh W. Johnson, Cedar Park, TX (US); Prakash U. Kartha, Round Rock, TX (US)

(73) Assignee: Temic Automotive of North America, Inc., Deer Park, IL (US)

( * ) Notice: Subject to any disclaimer, the term of this patent is extended or adjusted under 35 U.S.C. 154(b) by 101 days.

(21) Appl. No.: 11/015,133

(22) Filed: Dec. 17, 2004

(65) Prior Publication Data

US 2006/0083173 A1 Apr. 20, 2006

Related U.S. Application Data

(60) Provisional application No. 60/618,726, filed on Oct. 14, 2004.

(51) Int. Cl.
*H04J 1/16* (2006.01)
*H04J 3/14* (2006.01)

(52) U.S. Cl. .................................... 370/241; 370/242

(58) Field of Classification Search ................ 370/241, 370/242, 245, 246, 250, 252; 701/2, 23, 701/24, 29, 31, 33, 34, 35
See application file for complete search history.

(56) References Cited

U.S. PATENT DOCUMENTS 4,816,989 A 3/1989 Finn et al.
5,151,899 A 9/1992 Thomas et al.
5,195,091 A 3/1993 Farwell et al.
5,321,689 A 6/1994 Suzuki et al.
5,566,180 A 10/1996 Eidson et al.
5,612,953 A 3/1997 Olnowich
5,802,052 A 9/1998 Venkataraman
6,356,823 B1 3/2002 Iannotti et al.
6,373,834 B1 4/2002 Lundh et al.
6,420,797 B1 7/2002 Steele et al.
6,430,164 B1 8/2002 Jones
6,477,453 B2 * 11/2002 Oi et al. ........................ 701/31
6,559,783 B1 5/2003 Stoneking
6,611,519 B1 8/2003 Howe
6,611,537 B1 8/2003 Edens et al.

(Continued)

OTHER PUBLICATIONS

Controller Area Network (CAN)—Protocol, CAN in Automation (CIA), 5 pages, 2003.

(Continued)

*Primary Examiner*—Ajit Patel

(57) ABSTRACT

A system and method for reprogramming nodes in an automotive switch fabric network using a diagnostic interface. The switch fabric network includes a plurality of nodes joined by communication links for the transmission of data there between. The plurality of nodes includes at least one target node. The target node includes a processor, a transceiver, and a memory. The memory includes an erasable memory portion and a protected memory portion. The processor in the target node switches from executing instructions in the erasable memory portion to executing instructions in the protected memory portion during a reprogramming period when the target node erases a current software component and stores a new software component in its erasable memory portion. The diagnostic interface is adapted to transmit the new software component to the target node.

21 Claims, 6 Drawing Sheets

U.S. PATENT DOCUMENTS 6,643,465 B1 11/2003 Bösinger et al.
6,732,031 B1 * 5/2004 Lightner et al. ............... 701/33
6,747,365 B2 6/2004 Reinold et al.
6,757,521 B1 * 6/2004 Ying ....................... 455/67.11
6,845,416 B1 1/2005 Chasmawala et al.
7,027,773 B1 4/2006 McMillin
7,210,063 B2 * 4/2007 Holcroft et al. ............... 714/27
7,272,496 B2 9/2007 Remboski et al.
2002/0077739 A1 * 6/2002 Augsburger et al. ........ 701/115
2002/0080829 A1 6/2002 Ofek et al.
2002/0087891 A1 * 7/2002 Little et al. ................. 713/202
2003/0043739 A1 3/2003 Reinold et al.
2003/0043750 A1 3/2003 Remboski et al.
2003/0043779 A1 3/2003 Remboski et al.
2003/0043793 A1 3/2003 Reinold
2003/0043799 A1 3/2003 Reinold et al.
2003/0043824 A1 3/2003 Remboski et al.
2003/0045234 A1 3/2003 Remboski et al.
2003/0045971 A1 3/2003 Reinold et al.
2003/0045972 A1 3/2003 Remboski
2003/0046327 A1 3/2003 Reinold et al.
2003/0051131 A1 3/2003 Reinold et al.
2003/0065630 A1 4/2003 Brown
2003/0091035 A1 5/2003 Roy et al.
2003/0185201 A1 10/2003 Dorgan
2003/0188303 A1 * 10/2003 Barman et al. .............. 717/170
2004/0001593 A1 1/2004 Reinold et al.
2004/0002799 A1 1/2004 Dabbish et al.
2004/0003227 A1 1/2004 Reinold
2004/0003228 A1 1/2004 Fehr et al.
2004/0003229 A1 1/2004 Reinold et al.
2004/0003230 A1 1/2004 Puhl
2004/0003231 A1 1/2004 Levenson et al.
2004/0003232 A1 1/2004 Levenson et al.
2004/0003233 A1 1/2004 Reinold et al.
2004/0003234 A1 1/2004 Reinold et al.
2004/0003237 A1 1/2004 Puhl et al.
2004/0003242 A1 1/2004 Fehr
2004/0003243 A1 1/2004 Fehr et al.
2004/0003245 A1 1/2004 Dabbish et al.
2004/0003249 A1 1/2004 Dabbish
2004/0003252 A1 1/2004 Dabbish et al.
2004/0042469 A1 3/2004 Clark et al.
2004/0043739 A1 3/2004 Jordanger
2004/0043750 A1 3/2004 Kim
2004/0043824 A1 3/2004 Uzelac
2004/0045234 A1 3/2004 Morgan
2004/0045971 A1 3/2004 Lothe
2004/0131014 A1 7/2004 Thompson, III et al.
2004/0148460 A1 7/2004 Steinmetz et al.
2004/0213295 A1 10/2004 Fehr
2004/0227402 A1 11/2004 Fehr
2004/0254700 A1 12/2004 Fehr et al.
2004/0258001 A1 12/2004 Remboski et al.
2005/0004727 A1 1/2005 Remboski et al.
2005/0038583 A1 2/2005 Fehr et al.
2005/0160285 A1 * 7/2005 Evans ......................... 713/194
2005/0251604 A1 11/2005 Gerig
2005/0251608 A1 11/2005 Fehr et al.
2006/0013263 A1 1/2006 Fellman
2006/0013565 A1 1/2006 Baumgartner
2006/0020717 A1 1/2006 Remboski et al.
2006/0083172 A1 4/2006 Jordan et al.
2006/0083229 A1 4/2006 Jordan et al.
2006/0083250 A1 4/2006 Jordan et al.
2006/0083264 A1 4/2006 Jordan et al.
2006/0083265 A1 4/2006 Jordan et al.
2006/0282549 A1 12/2006 Vinnemann

OTHER PUBLICATIONS

D. John Oliver, Intel Corporation, “Implementing the J1850 Portocol”, 15 pages, available from the Internet at http://developer.intel.com/design/inlarch/papers/j1850_wp.pdf (per Internet Archive wavback Machine) Sep. 2000.

“Controller Area Network (CAN) - Protocol”, copyright 2003 by CAN in Automation (CIA), 5 pages, available from the Internet at http://www.can-cia.org/can/protocol/ (per Internet Archive Wayback Machine) May 2004.

* cited by examiner

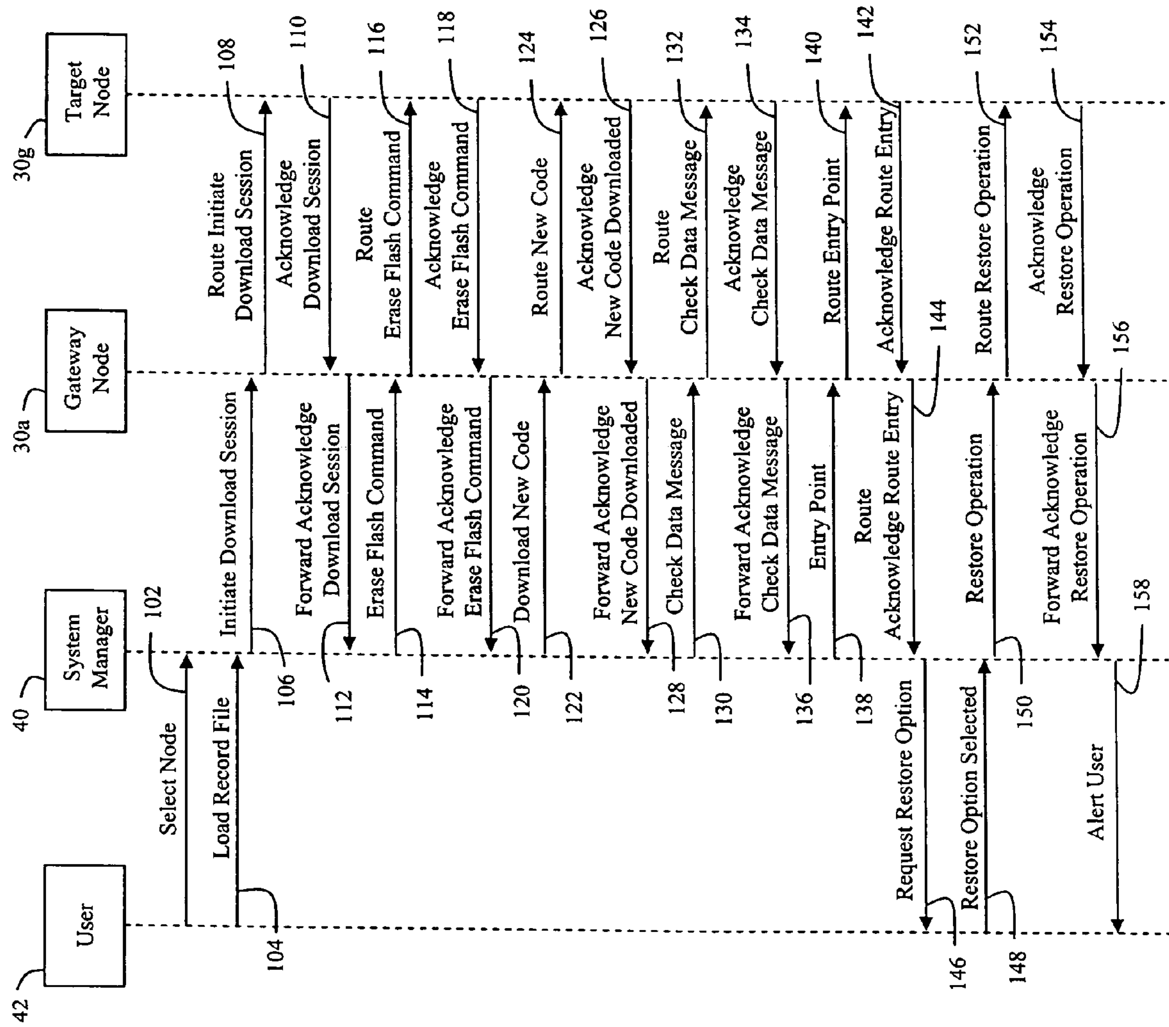

FIG. 6
User
System Manager
Gateway Node
Target Node
42
40
30a
30g
Select Node
Load Record File
Initiate Download Session
Route Initiate Download Session
Acknowledge Download Session
Forward Acknowledge Download Session
Erase Flash Command
Route Erase Flash Command
Acknowledge Erase Flash Command
Forward Acknowledge Erase Flash Command
Download New Code
Route New Code
Acknowledge New Code Downloaded
Forward Acknowledge New Code Downloaded
Check Data Message
Route Check Data Message
Acknowledge Check Data Message
Forward Acknowledge Check Data Message
Entry Point
Route Entry Point
Acknowledge Route Entry
Route Acknowledge Route Entry
Request Restore Option
Restore Option Selected
Restore Operation
Route Restore Operation
Acknowledge Restore Operation
Forward Acknowledge Restore Operation
Alert User
102
104
106
108
110
112
114
116
118
120
122
124
126
128
130
132
134
136
138
140
142
144
146
148
150
152
154
156
158

SYSTEM AND METHOD FOR REPROGRAMMING NODES IN AN AUTOMOTIVE SWITCH FABRIC NETWORK

The present application claims priority from provisional application, Ser. No. 60/618,726, entitled "System and Method for Reprogramming Nodes in an Automotive Switch Fabric Network," filed Oct. 14, 2004, which is commonly owned and incorporated herein by reference in its entirety.

FIELD OF THE INVENTION

This invention in general relates to in-vehicle communication networks and particularly to a system and method for reprogramming nodes in an automotive switch fabric network using a diagnostic interface.

BACKGROUND OF THE INVENTION

The commonly assigned United States patent application entitled "Vehicle Active Network," Ser. No. 09/945,581, Publication Number US 20030043793, filed Aug. 31, 2001, the disclosure of which is hereby expressly incorporated herein by reference, introduces the concept of an active network that includes a switch fabric. The switch fabric is a web of interconnected switching devices or nodes. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric nodes.

In the context of vehicular switch fabric networks, a challenge is presented in terms of how data is transported across the switch fabric network to reprogram switch fabric nodes and to maintain communication while memory is being reflashed. A need exists for the ability to reprogram switch fabric nodes when upgrading software components as well as reprogramming when a diagnosis detects a fault or problem.

It is, therefore, desirable to provide a system and method to overcome or minimize most, if not all, of the preceding problems especially in the area of reprogramming nodes in an automotive switch fabric network.

BRIEF DESCRIPTION OF THE DRAWINGS

FIG. 6 is a message flow diagram illustrating one embodiment of the types of message that may be exchanged during the reprogramming of the target node.

Figure 1:
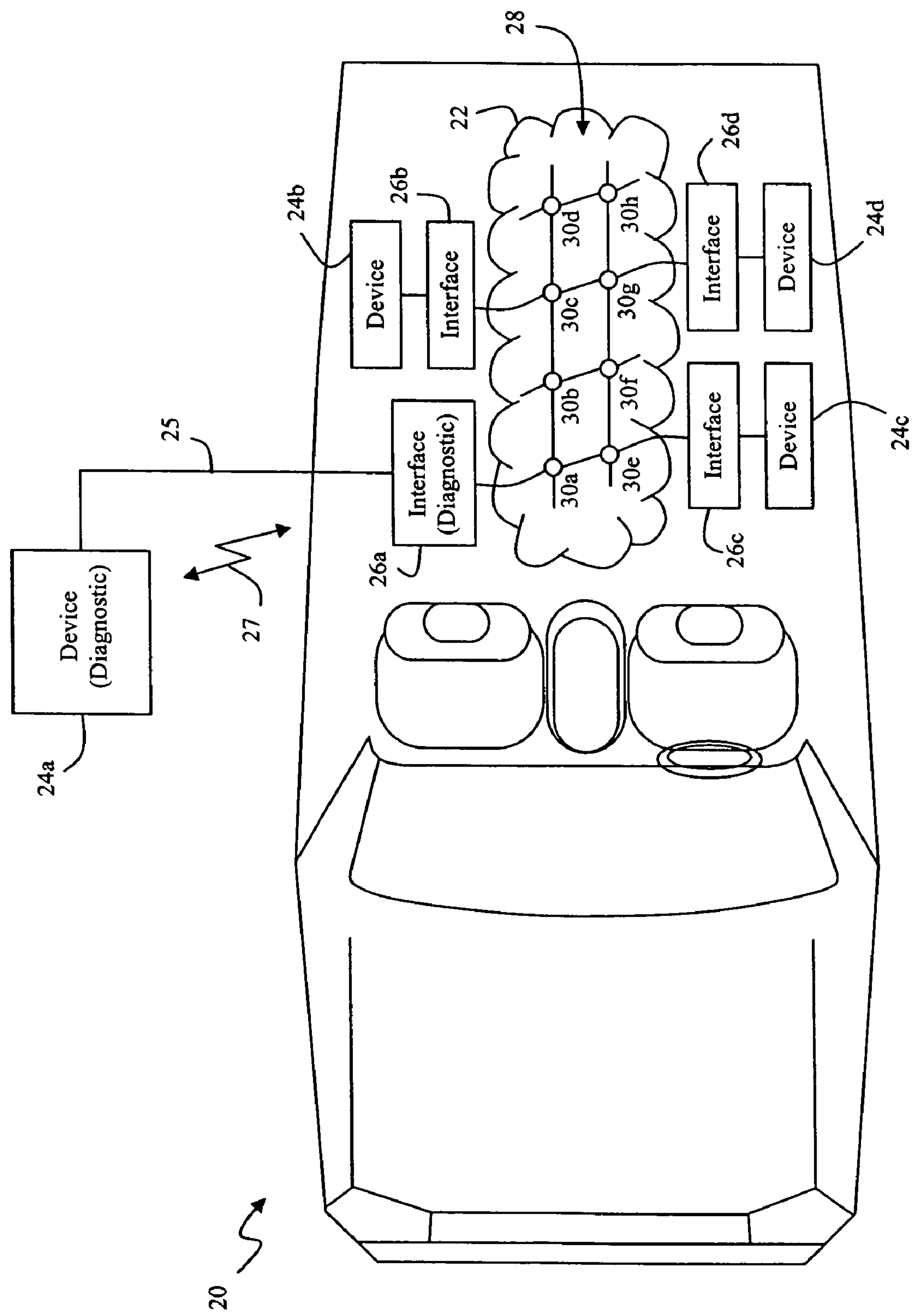
FIG. 1 is a block diagram illustrating an embodiment of a vehicle switch fabric network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for reprogramming nodes in an automotive switch fabric network using a diagnostic device and interface. In sum, a diagnostic device is used to download one or more record files containing software components to remote nodes in an automotive switch fabric network. The reprogramming instructions and record file(s) are routed from the diagnostic device and interface to a target switch fabric node through a gateway node. Two separate memory partitions are created in each target switch fabric node. One memory partition is erasable and contains the standard switch fabric networking software and applications (code block). The other memory partition is permanent and contains abridged switch fabric software that allows the node to function as a stand alone switch (boot block).

In one embodiment, the download process begins at the diagnostic device instructing a target node to initiate a reprogramming session. The node will switch from the code block to the boot block while continuing to function as a stand alone switch in the network. The diagnostic device may be configured to analyze the current existing software components to determine contiguous memory blocks and send individual erase flash messages for each memory block that needs to be erased. The target node will erase the memory as instructed and then send an acknowledgement to the diagnostic device. The diagnostic device then sends one or more record files to the target node, which copies the data to memory after verifying the checksum. After all records have been sent, the diagnostic device sends the entry point for the code block and instructs the target node to restore normal operations. The target node then switches back to the code block from the boot block and re-starts applications.

Now, turning to the drawings, FIG. 1 illustrates a vehicle 20 including a network 22 to which various vehicle devices 24*a-d* are coupled via respective interfaces 26*a-d*. The vehicle devices 24*a-d* may be sensors, actuators, and processors used in connection with various vehicle functional systems and sub-systems, such as, but not limited to, diagnostic, control-by-wire applications for throttle, braking and steering control, adaptive suspension, power accessory control, communications, entertainment, and the like. The devices 24*a-d* may be external or internal to the vehicle. The embodiment in FIG. 1 includes an external device 24*a* and several internal devices 24*b-d*.

The interfaces 26*a-d* are any suitable interface for coupling the particular vehicle device 24*a-d* to the network 22, and may be wire, optical, wireless or combinations thereof. The vehicle device 24*a-d* is particularly adapted to provide one or more functions associated with the vehicle 20. These vehicle devices 24*a-d* may be data producing, such as a sensor, data consuming, such as an actuator, or processing, which both produces and consumes data. In one embodiment, the external device 24*a* is a diagnostic device that permits a user to exchange data with the network of the vehicle, as will be explained further below. Data produced by or provided to a vehicle device 24*a-d*, and carried by the network 22, is independent of the function of the vehicle device 24*a-d* itself. That is, the interfaces 26*a-d* provides independent data exchange between the coupled device 24*a-d* and the network 22.

The connection between the devices 24*a-d* and the interfaces 26*a-d* may be a wired or wireless connection. FIG. 1 illustrates both types of connections between the diagnostic device 24*a* and its interface 26*a*, a wired connection 25 and a wireless connection 27. In the wireless connection, the device 24*a* and the interface 26*a* include wireless communication transceivers permitting the units to communicate with each other via an optical or radio frequency transmission. Additionally, the interface 26*a* may be a single device or incorporated as a single assembly as part of a gateway node 30*a*. Irregardless of the type of connection or type of assembly, the interface 26*a* to the diagnostic device 24*a* should arbitrate the linking of the device 24*a* to the network 22 through an authentication, security and encryption process.

The network 22 may include a switch fabric 28 defining a plurality of communication paths between the vehicle devices 24*a-d*. The communication paths permit multiple simultaneous peer-to-peer, one-to-many, many-to-many, etc. communications between the vehicle devices 24*a-d*. During operation of the vehicle 20, data exchanged, for example, between devices 24*a* and 24*d* may utilize any available path or paths between the vehicle devices 24*a*, 24*d*. In operation, a single path through the switch fabric 28 may carry all of a single data communication between one vehicle device 24*a* and another vehicle device 24*d*, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the devices 24*b*, 24*c* may occur simultaneously using the communication paths within the switch fabric 28.

The network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the network 22 uses asynchronous transfer mode (ATM) communication protocol, ATM standard data cells are used.

The internal vehicle devices 24*b-d* need not be discrete devices. Instead, the devices may be systems or subsystems of the vehicle and may include one or more legacy communication media, i.e., legacy bus architectures such as the Controller Area Network (CAN) protocol, the SAE J1850 Communications Standard, the Local Interconnect Network (LIN) protocol, the FLEXRAY Communications System Standard, the Media Oriented Systems Transport or MOST Protocol, or similar bus structures. In such embodiments, the respective interface 26*b-d* may be configured as a proxy or gateway to permit communication between the network 22 and the legacy device.

Figure 2:
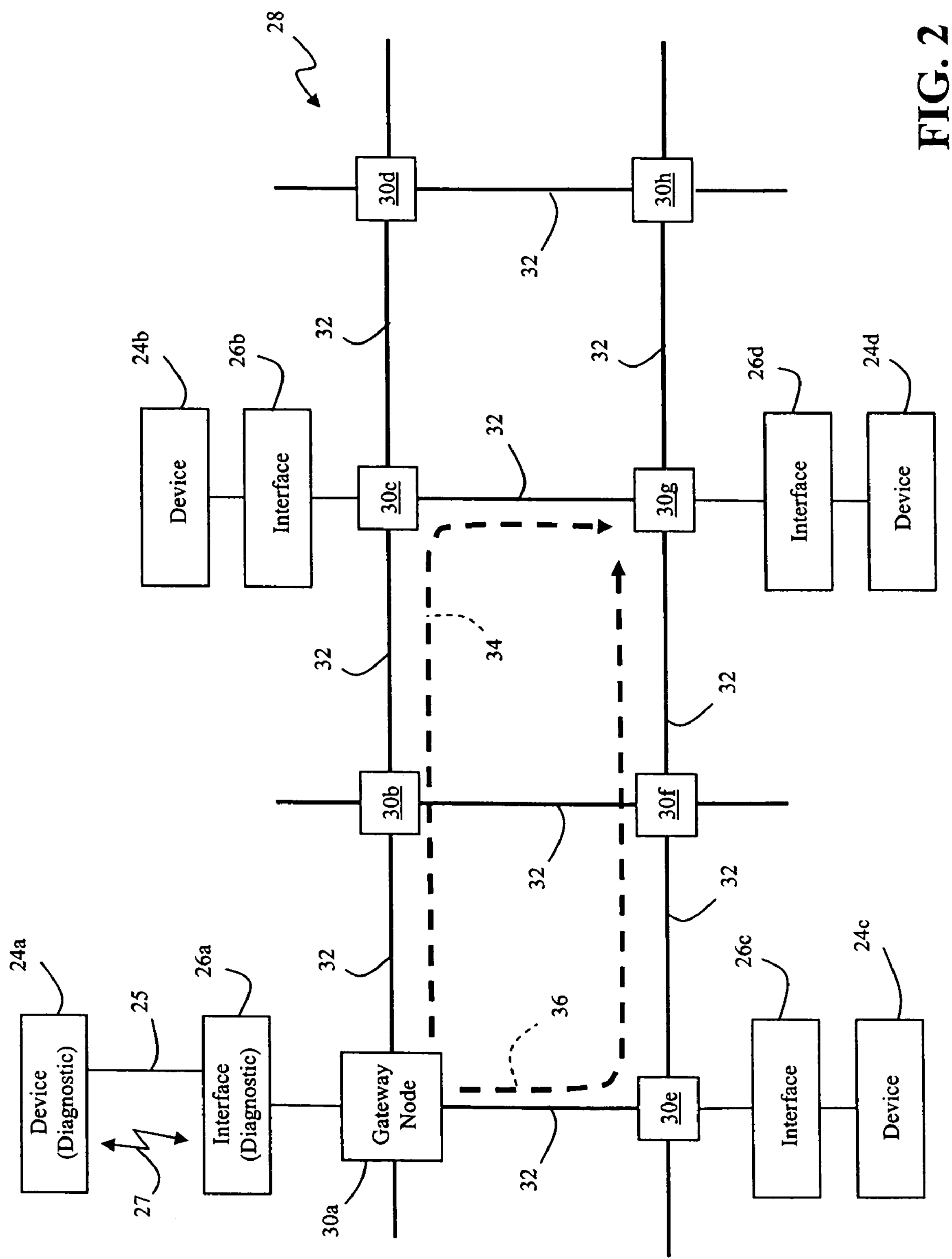
FIG. 2 is a diagram illustrating a portion of the switch fabric network connected to a plurality of interfaces and devices.

Referring to FIG. 2, an active network 22 in accordance with one embodiment of the present invention includes a switch fabric 28 of nodes 30*a-h* that communicatively couples a plurality of devices 24*a-d* via respective interfaces 26*a-d*. Connection media 32 interconnects the nodes 30*a-h*. The connection media 32 may be bounded media, such as wire or optical fiber, unbounded media, such as free optical or radio frequency, or combinations thereof. In addition, the term node is used broadly in connection with the definition of the switch fabric 28 to include any number of intelligent structures for communicating data packets within the network 22 without an arbiter or other network controller and may include: switches, intelligent switches, routers, bridges, gateways and the like. For instance, in the embodiment shown in FIG. 2, the node 30*a* may be a gateway node that connects the diagnostic interface 26*a* (and the diagnostic device 24*a*) to the switch fabric 28. Data is carried through the network 22 in data packet form guided by the nodes 30*a-h*.

The cooperation of the nodes 30*a-h* and the connection media 32 define a plurality of communication paths between the devices 24*a-d* that are communicatively coupled to the network 22. For example, a route 34 defines a communication path from the gateway node 30*a* to a target node 30*g*. If there is a disruption along the route 34 inhibiting communication of the data packets from the gateway node 30*a* to the target node 30*g*, for example, if one or more nodes are at capacity or have become disabled or there is a disruption in the connection media joining the nodes along route 34, a new route, illustrated as route 36, can be used. The route 36 may be dynamically generated or previously defined as a possible communication path, to ensure the communication between the gateway node 30*a* and the target node 30*g*.

Figure 3:
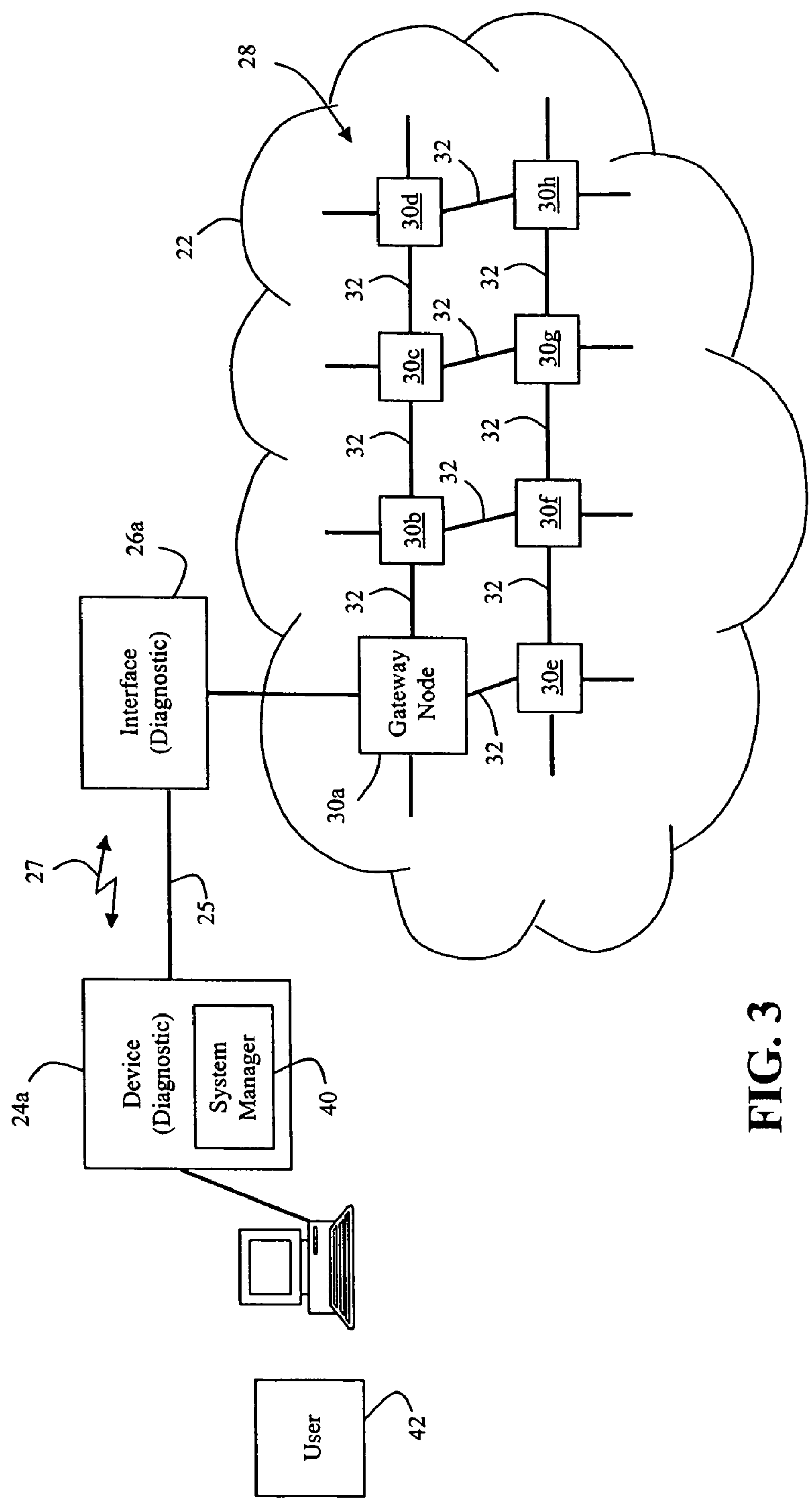
FIG. 3 is a diagram illustrating a portion of the switch fabric network connected to a diagnostic device and interface.

Some applications may require reprogramming of one or more nodes 30*a-h* in the switch fabric 28. The embodiment and topology shown in FIG. 3 advantageously permits the ability to upgrade or replace software and code in the switch fabric 28, including reprogramming software and code residing in the nodes 30*a-h*. FIG. 3 shows a user 42 that can interact with a diagnostic device 24*a*. The diagnostic device 24*a* contains a software manager 40 that includes instructions for initiating and controlling a reprogramming process of upgrading or replacing software and code in the switch fabric 28. The diagnostic device 24*a* is connected via a wired link 25 or a wireless link 27 to diagnostic interface 26*a*. The diagnostic interface 26*a* couples the diagnostic device 24*a* to the vehicle network 22 (and the switch fabric 28) through one of the nodes 30*a-h*, for example a gateway node 30*a*. In one embodiment, the diagnostic interface 26 is separate from the nodes 30*a-h* in the switch fabric network 28. However, in other embodiment, the diagnostic interface 26*a* and its functions may be incorporated into the gateway node 30*a*.

Figure 4:
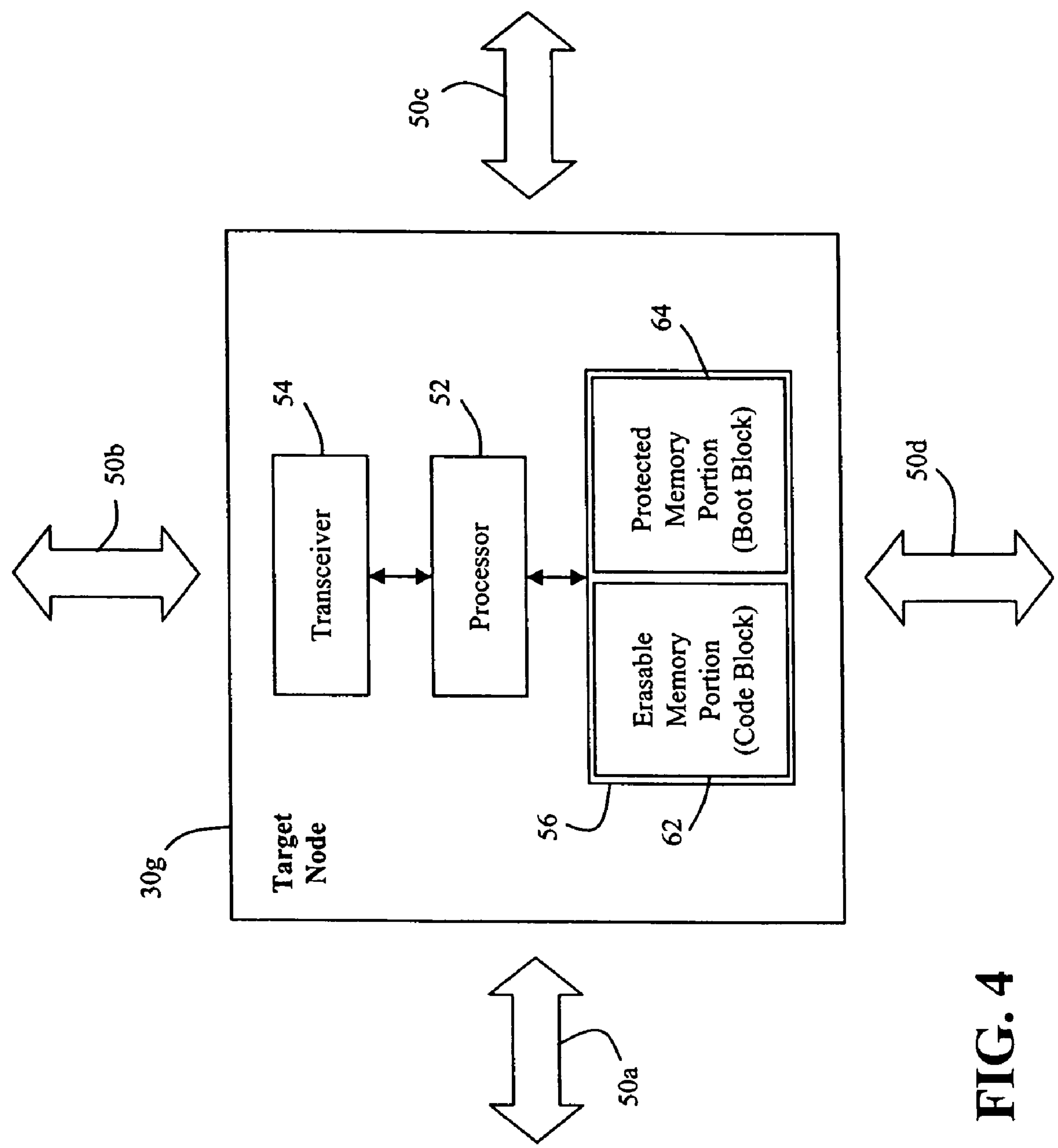
FIG. 4 is a diagram illustrating one embodiment of the components of a target node in the switch fabric network.

Each of the nodes 30*a-h* in the switch fabric 28 contain software components to enable data communications between the nodes 30*a-h* and devices 24*a-d*. A user 42 may use the diagnostic device 24*a* and the system manager 40 to send commands to upgrade or replace software and code in the switch fabric 28, including reprogramming software and code residing in the nodes 30*a-h*. For purposes of illustrating the present invention, assume that a user 42 desires to reprogram software components residing in a target node 30*g*. FIG. 4 shows one embodiment of a target node 30*g* that may be in need of new software components.

Figure 5:
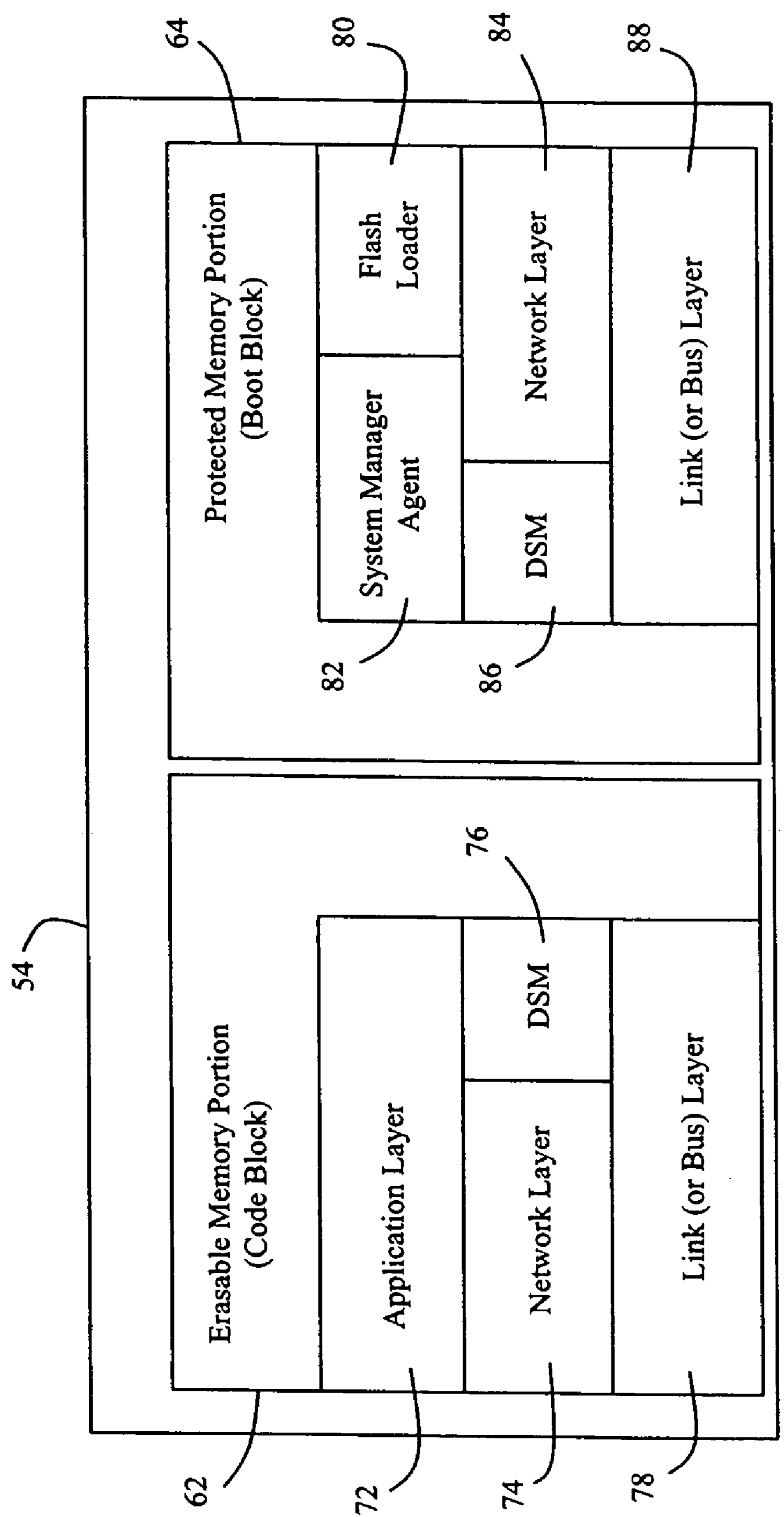
FIG. 5 is a diagram illustrating two memory portions of the target node in the switch fabric network.

To illustrate the functionality and the adaptability of the target node 30*g*, it is shown to include a plurality of input/output ports 50*a-d* although separate input and output ports could also be used. Various configurations of the target node 30*g* having more or fewer ports may be used in the network 22 depending on the application. The target node 30*g* includes a processor 52, at least one transceiver 54, and a memory 56. The memory 56 includes an erasable memory portion 62 and a protected memory portion 64. The processor 52 is configured to transfer control and execute instructions from software components residing in either the erasable memory portion 62 or the protected memory portion 64. The erasable memory portion 62 contains a set of software components (code block) to operate the target node 30*g* for normal data communications and operation within the switch fabric 28. In one embodiment, as shown in FIG. 5, the software components in the erasable memory portion 62 may include the complete software for an application layer 72, a network layer 74, and a link (or bus) layer 78. The erasable memory portion 62 may also include an embedded Distributed System Management (DSM) component 76 that can satisfy or act upon requests from the system manager 40. The DSM component 76 may be configured to work at one or more of the layers 72, 74, 78.

The protected memory portion 64 contains a set of software components (boot block) that includes functions to load software components safely and securely to the erasable memory portion 62. In one embodiment, as shown in FIG. 5, the software components residing on the protected memory portion 64 include a flash memory loader module 80, a system manager agent 82 (that can communicate with the system manager 40), and standard components for a network layer 84, and a link (or bus) layer 88. The protected memory portion 64 may also include an embedded Distributed System Management (DSM) component 86 that is similar to the DSM component 76 in the erasable memory portion 62. The protected memory portion 64 cannot be erased by the user 42, the diagnostic device 24*a*, or the system manager 40. The protected memory portion 64 is also not accessible from the software components residing on the erasable memory portion 62.

Upon startup of the target node 30*g*, control should go directly to the software components residing on the protected memory portion 64, including the flash memory loader module 80 mentioned above. If the flash memory loader module 80 fails to initialize hardware in the target node 30*g*, the target node 30*g* may be configured to go to a low power standby. In one embodiment, the flash memory loader 80, upon node startup, will determine if valid software components reside (and is available) in the erasable memory portion 62. This will ensure that corrupted or partial software components in the erasable memory portion 62 does not deadlock the target node 30*g*. This determination may be done by checking a key number stored in a prescribed location in the erasable memory portion 62. If the key number is stored in the prescribed location, the processor 50 may be configured to switch control of the target node 30*g* from executing the software components residing on its protected memory portion 64 to the software components residing on its erasable memory portion 62.

If, however, the key number is not stored in the prescribed location, the flash memory loader 80 may assume that the software components in the erasable memory portion 62 is not valid and send a notification that the target node 30*g* needs to be reprogrammed. This notification may be sent to the gateway node 30*a* that will then forward the request to the system manager 40 residing on the diagnostic device 24*a*. The flash memory loader 80 should then remain in an idle state to await instructions from the system manager 40 to initiate reprogramming of the software components in the erasable memory portion 62, as will be explained in more detail below.

Additionally, the diagnostic system may be configured to allow the system manager 40 to query each node 30*a-h* in the switch fabric 28 to determine whether a node needs to be reprogrammed. In one embodiment, the system manager 40 may initiate a status dialogue with a target node 30*g* by sending a status request message to the gateway node 30*a*. The gateway node 30*a* will then route the status request message to the target node 30*g*. The target node 30*g* may then be configured to respond to the status request message by transmitting a status response message to the gateway node 30*a*, who may then forward the message back to the system manager 40. Depending on the content of the status response message, a user 42 may decide to reprogram a specific target node 30*g*.

FIG. 6 is a message flow diagram that illustrates one embodiment of a sequence of steps that a user 42 may take in reprogramming a target node 30*g*. The message flow diagram shows messages that may be exchanged between the user 42, the system manager 40 (residing on the diagnostic device 24*a*), the gateway node 30*a*, and the target node 30*g*. The user 42 may initiate the reprogramming operation using the system manager 42 by selecting the node identification of the target node 30*g* to be reprogrammed (arrow 102). The user 42 may then load a record file in the system manager 40 from a host's file system (arrow 104).

The system manager 40, residing on the diagnostic device 24*a*, will then initiate a download session with the target node 30*g*. In one embodiment, the system manager 40 may send an initiate download session message through the diagnostic interface 26*a* to the gateway node 30*a* (arrow 106). The gateway node 30*a* will then route the initiate download session message to the target node 30*g* (arrow 108).

In response to receiving an initiate download session message, the target node 30*g*, including processor 50, may be configured to switch from executing the software components residing on its erasable memory portion 62 to the software components residing on its protected memory portion 64. As mentioned above, it is preferred that software components in both the erasable memory portion 62 and the protected memory portion 64 include at least standard software components for the network layer 74, the Distributed System Management (DSM) component 76, and the link (or bus) layer 78. This will cause normal network functions to continue uninterrupted. However, any applications running on the target node 30*g* will not be available. After switching control from the software components residing on its erasable memory portion 62 to the software components residing on its protected memory portion 64, the target node 30*g* may then send an acknowledge download session message to the gateway node 30*a* (arrow 110), who will then forward the message to the system manager 40 (arrow 112).

After receiving the acknowledgement from the target node 30*g*, the system manager 40 will then send an erase flash command to the gateway node 30*a* for each block of memory that needs to be erased (arrow 114). The diagnostic device 24*a* may be configured to analyze the current software components and send one or more commands to erase some or all of the memory blocks in erasable memory portion 62. The gateway node 30*a* will route the erase flash command to the target node 30*g* (arrow 116). Upon receipt of the erase flash command, the target node 30*g* will erase the corresponding memory locations in the command. The target node 30*g* may then send an acknowledge erase flash command to the gateway node 30*a* (arrow 118), who will then forward the message to the system manager 40 (arrow 120).

The system manager 40 may then send a new set of compiled software components to the gateway node 30*a* (arrow 122). The gateway node 30*a* will route the new set of compiled software components to the target node 30*g* (arrow 124). The target node 30*g* may then send an acknowledge new software components to the gateway node 30*a* (arrow 126), who will then forward the message to the system manager 40 (arrow 128). The system manager 40 may repeat the process of downloading software components until all necessary components are received by the target node 30*g*.

The system manager 40 may then send a check data message to the gateway node 30*a* (arrow 130). In one embodiment, the check data message includes a checksum for the new downloaded software components. The gateway node 30*a* will route the check data message to the target node 30*g* (arrow 132). The target node 30*g* will then calculate the checksum for the new set of software components into its erasable memory portion 62 and compare it against checksum received from the system manager 40. Assuming that the checksum matches, the target node 30_g_ will then write the new set of software components into its erasable memory portion 62. The target node 30_g_ may then send an acknowledge check data message to the gateway node 30_a_ (arrow 134), who will then forward the message to the system manager 40 (arrow 136).

The system manager 40 may then send an entry point message to the gateway node 30_a_ (arrow 138). In one embodiment, the entry point message includes an entry point for the code block. The gateway node 30_a_ will route the entry point message to the target node 30_g_ (arrow 140). In response, the target node 30_g_ sends an acknowledge entry point message to the gateway node 30_a_ (arrow 142), who will then forward the message to the system manager 40 (arrow 144).

Upon receiving the acknowledgement for the entry point message, the system manager 40 may then inform the user 42 about the successful completion of the download operation and provide the user 42 with an option to restore or reset the target node 30_g_ (arrow 146). The user 42 may wish to postpone the restoration of the node until diagnosis of other nodes is complete. However, when the user 42 desires to restore the node, the user 42 may select a restore option to the system manager 40 (arrow 148). At this point, the system manager 40 may then send a restore operation message to the gateway node 30_a_ (arrow 150). The gateway node 30_a_ will then route the restore operation message to the target node 30_g_ (arrow 152).

After receiving the restore operation message, the target node 30_g_, including processor 50, will then switch from executing the software components residing on its protected memory portion 64 to the software components residing on its erasable memory portion 62. This will allow normal operation of applications to run again on the target node 30_g_. The target node 30_g_ may then send an acknowledge restore operation message to the gateway node 30_a_ (arrow 154), who will then forward the message to the system manager 40 (arrow 156). The system manager 40 may then alert the user 42 that the acknowledgement was received from the target node 30_g_ (arrow 158).

What has been described is a system and method for reprogramming nodes in an automotive switch fabric network using a diagnostic interface. A diagnostic device and interface is used to download one or more record files containing software components to remote nodes in an automotive switch fabric network. The reprogramming instructions and record files are routed from the diagnostic device and interface to a target switch fabric node through a gateway node. Two separate memory partitions are created in each target switch fabric node. One memory partition is erasable and contains the standard switch fabric networking software and applications (code block). The other memory partition is permanent and contains abridged switch fabric software that allows the node to function as a stand alone switch (boot block). The node will switch from the code block to the boot block while continuing to function as a stand alone switch in the network. The target node will erase the memory as instructed and then send an acknowledgement to the diagnostic device. The diagnostic device then sends one or more record files to the target node, which copies the data to memory after verifying the checksum. The target node then switches back to the code block from the boot block and re-starts applications. The above description of the present invention is intended to be exemplary only and is not intended to limit the scope of any patent issuing from this application. The present invention is intended to be limited only by the scope and spirit of the following claims.

What is claimed is:

1. A vehicle network comprising:

a plurality of nodes joined by communication links for the transmission of data there between, the plurality of nodes including at least one target node, the target node including a processor, a transceiver, and a memory, the memory including an erasable memory portion and a protected memory portion;

a diagnostic interface adapted to transmit a new software component to the target node;

wherein the processor in the target node switches from executing instructions in the erasable memory portion to executing instructions in the protected memory portion during a reprogramming period when the target node erases a current software component and stores the new software component in its erasable memory portion.

2. The vehicle network in claim 1, wherein the erasable memory portion in the target node includes software for an application layer, a network layer, and a link layer.

3. The vehicle network in claim 1, wherein the protected memory portion in the target node includes software for a flash memory loader, a system manager agent, a network layer, and a link layer.

4. The vehicle network in claim 1, wherein the diagnostic interface receives the new software component from a diagnostic device in response to an input from a remote user that identifies the target node.

5. The vehicle network in claim 1 further comprising a gateway node that is adapted to receive the new software component from the diagnostic interface and route the new software component to the target node.

6. The vehicle network in claim 1 wherein the processor in the target node switches from executing instructions in the erasable memory portion to executing instructions in the protected memory portion in response to reprogramming message received from the diagnostic interface.

7. The vehicle network in claim 1 wherein the processor in the target node stores the new software component in its erasable memory portion after verifying a checksum received from the diagnostic interface.

8. A diagnostic system for a vehicle network, the vehicle network including a plurality of nodes joined by communication links for the transmission of data there between, the plurality of nodes including at least one target node and a gateway node, the target node including a processor, a transceiver, and a memory, the memory including an erasable memory portion and a protected memory portion, the diagnostic system comprising:

a diagnostic interface connected to the gateway node;

a diagnostic device connected to the diagnostic interface, the diagnostic device having a system manager for controlling a reprogramming process to replace at least one current software component residing in the erasable memory portion with at least one new software component;

wherein the reprogramming process includes a message transmitted from the system manager to the target node, the message causing the target node to switch from executing instructions in the erasable memory portion to executing instruction in the protected memory portion before replacing the at least one current software component residing in the erasable memory portion.

9. The diagnostic system in claim 8, wherein the erasable memory portion in the target node includes software for an application layer, a network layer, and a link layer.

10. The diagnostic system in claim 8, wherein the protected memory portion in the target node includes software for a flash memory loader, a system manager agent, a network layer, and a link layer.

11. The diagnostic system in claim 8, wherein the diagnostic interface receives the at least one new software component from the diagnostic device in response to an input from a remote user that identifies the target node.

12. The diagnostic system in claim 11, wherein the gateway node receives the at least one new software component from the diagnostic interface and routes the at least one new software component to the target node.

13. The diagnostic system in claim 8 wherein the reprogramming process includes a second message transmitted from the system manager to the target node, the second message causing the target node to erase the at least one current software component in its erasable memory portion.

14. The diagnostic system in claim 13 wherein the reprogramming process includes a third message transmitted from the system manager to the target node, the third message causing the target node to perform a checksum operation after receiving the at least one new software component from the diagnostic device.

15. The diagnostic system in claim 14 wherein the reprogramming process includes a fourth message transmitted from the system manager to the target node, the fourth message causing the target node to store the at least one new software component in its erasable memory portion.

16. A method for reprogramming nodes in a switch fabric of a vehicle communication network, the switch fabric including a plurality of nodes joined by communication links for the transmission of data there between, the plurality of nodes including at least one target node and a gateway node, the target node including a processor, a transceiver, and a memory, the memory including an erasable memory portion and a protected memory portion, the method comprising the steps of:

receiving, at the gateway node, a reprogramming message and routing the reprogramming message to the target node;

switching, at the target node, from executing instructions in the erasable memory portion to executing instructions in the protected memory portion;

erasing, at the target node, at least one current software component in the erasable memory portion;

receiving, at the gateway node, at least one new software component and routing the new software component to the target node;

storing, at the target node, the new software component in the erasable memory portion; and switching, at the target node, from executing instructions in the protected memory portion to executing instructions in the erasable memory portion.

17. The method in claim 16, wherein the step of receiving a reprogramming message at the gateway node is sent by a diagnostic interface.

18. The method in claim 16, wherein the erasable memory portion of the memory in the target node includes software for an application layer, a network layer, and a link layer.

19. The method in claim 16, wherein the protected memory portion of the memory in the target node includes software for a flash memory loader, a system manager agent, a network layer, and a link layer.

20. The method in claim 16, wherein the step of receiving at least one new software component at the gateway node is sent by a diagnostic interface.

21. The method in claim 16 if further comprising the steps of:

receiving, at the gateway node, a checksum message and routing the checksum message to the target node; and performing, at the target node, a checksum operation prior to the step of storing the at least one new software component in the erasable memory portion.

* * * * *

UNITED STATES PATENT AND TRADEMARK OFFICE

CERTIFICATE OF CORRECTION

PATENT NO. : 7,593,344 B2
APPLICATION NO. : 11/015133
DATED : September 22, 2009
INVENTOR(S) : Jordan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twenty-first Day of September, 2010

David J. Kappos
*Director of the United States Patent and Trademark Office*